US012343898B2

(12) United States Patent
Hanley

(10) Patent No.: US 12,343,898 B2
(45) Date of Patent: Jul. 1, 2025

(54) FLEXI-BAT

(71) Applicant: Chelsi Hanley, Dracut, MA (US)

(72) Inventor: Chelsi Hanley, Dracut, MA (US)

( * ) Notice: Subject to any disclaimer, the term of this patent is extended or adjusted under 35 U.S.C. 154(b) by 348 days.

(21) Appl. No.: 17/503,249

(22) Filed: Oct. 15, 2021

(65) Prior Publication Data

US 2022/0118649 A1 Apr. 21, 2022

Related U.S. Application Data

(60) Provisional application No. 63/091,955, filed on Oct. 15, 2020.

(51) Int. Cl.

*B28B 1/02* (2006.01)
*B28B 7/00* (2006.01)
*B28B 7/06* (2006.01)

(52) U.S. Cl.

CPC ................ *B28B 1/02* (2013.01); *B28B 1/025* (2013.01); *B28B 7/0076* (2013.01); *B28B 7/0082* (2013.01); *B28B 7/06* (2013.01)

(58) Field of Classification Search

CPC ........... B28B 11/10; B28B 7/06; B28B 1/025; B28B 7/0076; B28B 11/08; B28B 11/0809; B28B 11/0836; B28B 11/0863; B28B 7/0064; B28B 7/0079; B29C 44/5627; Y10S 425/12; Y10S 452/12; Y10S 29/037; B44B 2700/08

USPC ....... 264/116, 252, 133, 256, 219, 220–227; 425/263–268, 459, 121, 263–268

See application file for complete search history.

(56) References Cited

U.S. PATENT DOCUMENTS 2,013,949 A * 9/1935 Clark ...................... B29C 33/40 264/220
3,347,162 A * 10/1967 Braznell ................... B41C 3/04 101/376
3,627,861 A * 12/1971 Timke ..................... B28B 7/364 264/293
3,849,054 A * 11/1974 Jordache ................. B28B 1/025 425/266
4,689,001 A * 8/1987 Yoder ..................... B28B 1/025 425/459
4,702,920 A 10/1987 Goodman
5,244,376 A 9/1993 Meyers
5,261,194 A 11/1993 Roberts
5,329,737 A 7/1994 Roberts et al.

(Continued)

FOREIGN PATENT DOCUMENTS

GB 2568067 A * 5/2019 .............. B28B 1/30
JP 2020163655 A * 10/2020

OTHER PUBLICATIONS

NPL_EVA vs. HIPS_MakeItFrom.com (Year: 2020).*

(Continued)

*Primary Examiner* — Jeffrey M Wollschlager
*Assistant Examiner* — Edgaredmanuel Troche
(74) *Attorney, Agent, or Firm* — Daniel N. Smith

(57) ABSTRACT

A flexible bat for attachment to a pottery wheel. The flexible bat containing a pre-engraved design impresses texts, patterns, or designs onto the bottom surface of clay workpieces as they are simultaneously molded on the pottery wheel. These simultaneous steps save time and eliminate the additional steps of impressing these designs to the bottom of pliant clay pieces after molding is completed on the pottery wheel.

7 Claims, 15 Drawing Sheets

(56) References Cited

U.S. PATENT DOCUMENTS

| | | | | |
|---|---|---|---|---|
| 7,261,543 | B2 | 8/2007 | Lester | |
| 7,641,464 | B2 | 1/2010 | Griffin et al. | |
| 9,815,221 | B1 * | 11/2017 | Warnock | B28B 11/0809 |
| 2005/0100708 | A1 * | 5/2005 | McKinney | C04B 41/80<br>428/131 |
| 2008/0210647 | A1 * | 9/2008 | Hornak | F26B 15/04<br>211/13.1 |
| 2012/0216659 | A1 * | 8/2012 | Bailey | B28B 1/025<br>29/559 |

OTHER PUBLICATIONS

NPL_ANXIN_Flexible 6.0mm High Impact Polystyrene Sheet (Year: 2020).*

NPL_2014_Using Silicone Molds with Polymer Clay—The Blue Bottle Tree (Year: 2014).*

* cited by examiner

FLEXI-BAT

CROSS REFERENCE TO RELATED APPLICATION

This application claims the benefit of U.S. Provisional Patent Application No. 63/091,955 filed on Oct. 15, 2020, the contents of which are incorporated herein by reference.

FIELD OF THE INVENTION

This invention relates to a flexible bat for attachment to a pottery wheel, that impresses pre-engraved texts, patterns, or designs onto the bottom surface of clay workpieces as they are simultaneously molded on the pottery wheel.

BACKGROUND OF INVENTION

Pottery is often created from soft, pliant clay that is formed into a desired size and shape on a pottery wheel. A wheel head on the pottery wheel provides a rotating flat surface on which a potter can form the pliant clay into a workpiece.

Traditionally, clay is thrown directly on the wheel head or on a sturdy hard disk known as a bat. A bat allows removal of a soft clay workpiece from the wheel head without damaging or deforming the workpiece. Wheel heads may include various structures for attaching a bat to the upper surface of the wheel head, including bat pins. Attaching a bat to bat pins permits the bat to rotate in sync with the wheel head. The soft clay is rotated on the wheel head and bat to create round shapes, such as vases, cups, bowls, plates, and pitchers.

The structures of pottery wheels and bats do not permit easy formation of text, patterns, and designs onto the bottom of workpieces, as the bottom surface of workpieces maintains contact with the wheel head for stability. To add such text, patterns, or designs to workpieces, potters often choose to form them during various stages of the clay's drying process, after the workpieces have been removed from the bat and wheel head. This often results in damaged or deformed workpieces. In addition, this method limits the types of intricate designs that may be formed on the bottom surface of workpieces.

The present invention is designed to permit the creation and addition of pre-planned text, patterns, and designs to the bottom surfaces of pliant clay workpieces while these workpieces are simultaneously being formed on the pottery wheel.

The present invention is a flexible bat, designed and manufactured with pre-planned engraved texts, patterns, or designs, that may be attached to a wheel head. The engraved texts, patterns, and designs of the bat are inverse impressed into the soft bottom surface of the clay workpieces as they are being formed on the wheel head. This flexible bat allows a potter to add designs, art, textures, and texts to the bottom of a workpiece without additional steps or time, and without additional risks of damaging the workpiece. In addition, the flexible bat can be used as a relief mould to impress pliant or moldable clay into itself, allowing a potter to make a pre- or post made slab.

SUMMARY OF THE INVENTION

There are additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

The subject invention discloses a flexible bat for removeable attachment to a wheel head of a pottery wheel for securely holding a clay workpiece during rotation of the wheel head, the flexible bat comprising: a flexible body comprising a substantially planar bottom surface to engage at least a portion of a top surface of the wheel head, and a substantially planar top surface defining a working surface for acceptance of the workpiece thereon, wherein the body comprises a single piece; at least two apertures on the flexible body extending from the bottom surface towards the top surface, the at least two apertures being shaped and sized to at least partially receive a bat pin of the wheel head therein; a raised surface on the top surface of the flexible body, the raised surface comprising an engraved design; wherein a bottom surface of the clay workpiece is impressed with an inverse texture of the engraved design while the clay workpiece is securely held on the flexible bat and wheel head during rotation; further wherein the clay workplace is removable from the raised surface of the flexible bat such that the inverse texture of the engraved design remains impressed on the bottom surface of the clay workpiece after removal.

The subject invention discloses a flexible bat for attachment to a wheel head of a pottery wheel for securely holding a clay workpiece during rotation of the wheel head, the flexible bat comprising: a flexible single piece body comprising a substantially flat bottom surface to engage at least a portion of a top surface of the wheel head, and a substantially flat top surface defining a working surface for acceptance of the workpiece thereon; at least two apertures on the flexible body extending from the bottom surface towards the top surface, the at least two apertures being shaped and sized to at least partially receive a bat pin of the wheel head therein; a raised surface on the top surface of the flexible body, the raised surface comprising a pre-cut design; wherein a bottom surface of the clay workpiece is stamped with an inverse texture of the pre-cut design while the clay workpiece is securely held on the flexible bat and wheel head during rotation; further wherein the clay workplace is removable from the raised surface of the flexible bat such that the inverse texture of the pre-cut design remains stamped on the bottom surface of the clay workpiece after removal.

The subject invention discloses a flexible bat for attachment to a wheel head of a pottery wheel for securely holding a clay workpiece during rotation of the wheel head, the flexible bat comprising: a flexible single piece body comprising a substantially flat bottom surface to engage at least a portion of a top surface of the wheel head, and a substantially flat top surface defining a working surface for acceptance of the workpiece thereon; at least two apertures on the flexible body extending from the bottom surface towards the top surface, the at least two apertures being shaped and sized to at least partially receive a bat pin of the wheel head therein; a raised surface on the top surface of the flexible body, the raised surface comprising a pre-cut pattern; wherein a bottom surface of the clay workpiece is indented with an inverse texture of the pre-cut pattern while the clay workpiece is securely held on the flexible bat and wheel head during rotation; further wherein the clay workplace is removable from the raised surface of the flexible bat such that the inverse texture of the pre-cut pattern remains indented on the bottom surface of the clay workpiece after removal.

The subject invention discloses a flexible bat for removeable attachment to a wheel head of a pottery wheel for securely holding a clay workpiece during rotation of the wheel head, the flexible bat comprising: a flexible body comprising a substantially planar bottom surface to engage at least a portion of a top surface of the wheel head, and a substantially planar top surface defining a working surface for acceptance of the workpiece thereon, wherein the body comprises a single piece; at least two apertures on the flexible body extending from the bottom surface towards the top surface, the at least two apertures being shaped and sized to at least partially receive a bat pin of the wheel head therein; an engraved design on the top surface of the flexible body; wherein a bottom surface of the clay workpiece is impressed with an inverse texture of the engraved design while the clay workpiece is securely held on the flexible bat and wheel head during rotation; further wherein the clay workplace is removable from the top surface of the flexible bat such that the inverse texture of the engraved design remains impressed on the bottom surface of the clay workpiece after removal.

The subject invention discloses a flexible bat for attachment to a wheel head of a pottery wheel for securely holding a clay workpiece during rotation of the wheel head, the flexible bat comprising: a flexible single piece body comprising a substantially flat bottom surface to engage at least a portion of a top surface of the wheel head, and a substantially flat top surface defining a working surface for acceptance of the workpiece thereon; at least two apertures on the flexible body extending from the bottom surface towards the top surface, the at least two apertures being shaped and sized to at least partially receive a bat pin of the wheel head therein; a pre-cut design on the top surface of the flexible body; wherein a bottom surface of the clay workpiece is stamped with an inverse texture of the pre-cut design while the clay workpiece is securely held on the flexible bat and wheel head during rotation; further wherein the clay workplace is removable from the top surface of the flexible bat such that the inverse texture of the pre-cut design remains stamped on the bottom surface of the clay workpiece after removal.

The subject invention discloses a flexible bat for attachment to a wheel head of a pottery wheel for securely holding a clay workpiece during rotation of the wheel head, the flexible bat comprising: a flexible single piece body comprising a substantially flat bottom surface to engage at least a portion of a top surface of the wheel head, and a substantially flat top surface defining a working surface for acceptance of the workpiece thereon; at least two apertures on the flexible body extending from the bottom surface towards the top surface, the at least two apertures being shaped and sized to at least partially receive a bat pin of the wheel head therein; a pre-cut pattern on the top surface of the flexible body; wherein a bottom surface of the clay workpiece is indented with an inverse texture of the pre-cut pattern while the clay workpiece is securely held on the flexible bat and wheel head during rotation; further wherein the clay workplace is removable from the top surface of the flexible bat such that the inverse texture of the pre-cut pattern remains indented on the bottom surface of the clay workpiece after removal.

The subject invention discloses a method for impressing a design onto a bottom surface of a clay workpiece that is simultaneously secured to a wheel head of a pottery wheel, the method comprising: (a) creating the design for impression onto the bottom surface of the workpiece; (b) creating an inverse image of the design; (c) engraving the inverse image of the design into a substantially planar top surface of a flexible bat, wherein the bat comprises a single piece flexible body; (d) attaching a substantially planar bottom surface of flexible bat to a top surface of the wheel head, wherein the bottom surface engages at least a portion of the top surface of the wheel head; (e) securing the flexible bat to the wheel head with at least two apertures extending from the bottom surface of the bat towards the top surface of the bat, wherein the two apertures are shaped and sized to at least partially receive a bat pin of the wheel head; (f) securing the workpiece to the top surface of flexible bat, wherein the bottom surface of the workpiece is placed over the engraved inverse image of the design on the bat; (g) impressing the bottom surface of the workpiece with the engraved inverse image of the design while simultaneously working on the workpiece on the wheel head of the pottery wheel; and (h) removing the workpiece from the flexible bat such that the engraved inverse image of the design remains impressed on the bottom surface of the workpiece after removal.

The subject invention discloses a method for stamping a pattern onto a bottom surface of a clay workpiece that is simultaneously secured to a wheel head of a pottery wheel, the method comprising: (a) creating the pattern for stamping onto the bottom surface of the workpiece; (b) creating an inverse image of the pattern; (c) cutting the inverse image of the pattern into a substantially planar top surface of a flexible bat, wherein the bat comprises a single piece flexible body; (d) attaching a substantially planar bottom surface of the flexible bat to a top surface of the wheel head, wherein the bottom surface engages at least a portion of the top surface of the wheel head; (e) securing the flexible bat to the wheel head with at least two apertures extending from the bottom surface of the bat towards the top surface, wherein the two apertures are shaped and sized to at least partially receive a bat pin of the wheel head; (f) securing the workpiece to the top surface of flexible bat, wherein the bottom surface of the workpiece is placed over the cut inverse image of the pattern on the bat; (g) stamping the bottom surface of the workpiece with the cut inverse image of the pattern while simultaneously working on the workpiece on the wheel head of the pottery wheel; and (h) removing the workpiece from the flexible bat such that the cut inverse image of the design remains stamped on the bottom surface of the workpiece after removal.

In embodiments of the subject invention, the term "substantially" is defined as at least close to (and can include) a given value or state, as understood by a person of ordinary skill in the art. In one embodiment, the term "substantially" refers to ranges within 10%, preferably within 5%, more preferably within 1%, and most preferably within 0.1% of the given value or state being specified.

In embodiments of the subject invention, the term "relatively" is defined as a comparison of a property, or the proportion of a property between two components.

BRIEF DESCRIPTION OF THE DRAWINGS

Advantages of the present invention will be apparent from the following detailed description of embodiments, which description should be considered in conjunction with the accompanying drawings, in which.

DETAILED DESCRIPTION OF THE EMBODIMENTS

Figure 13:
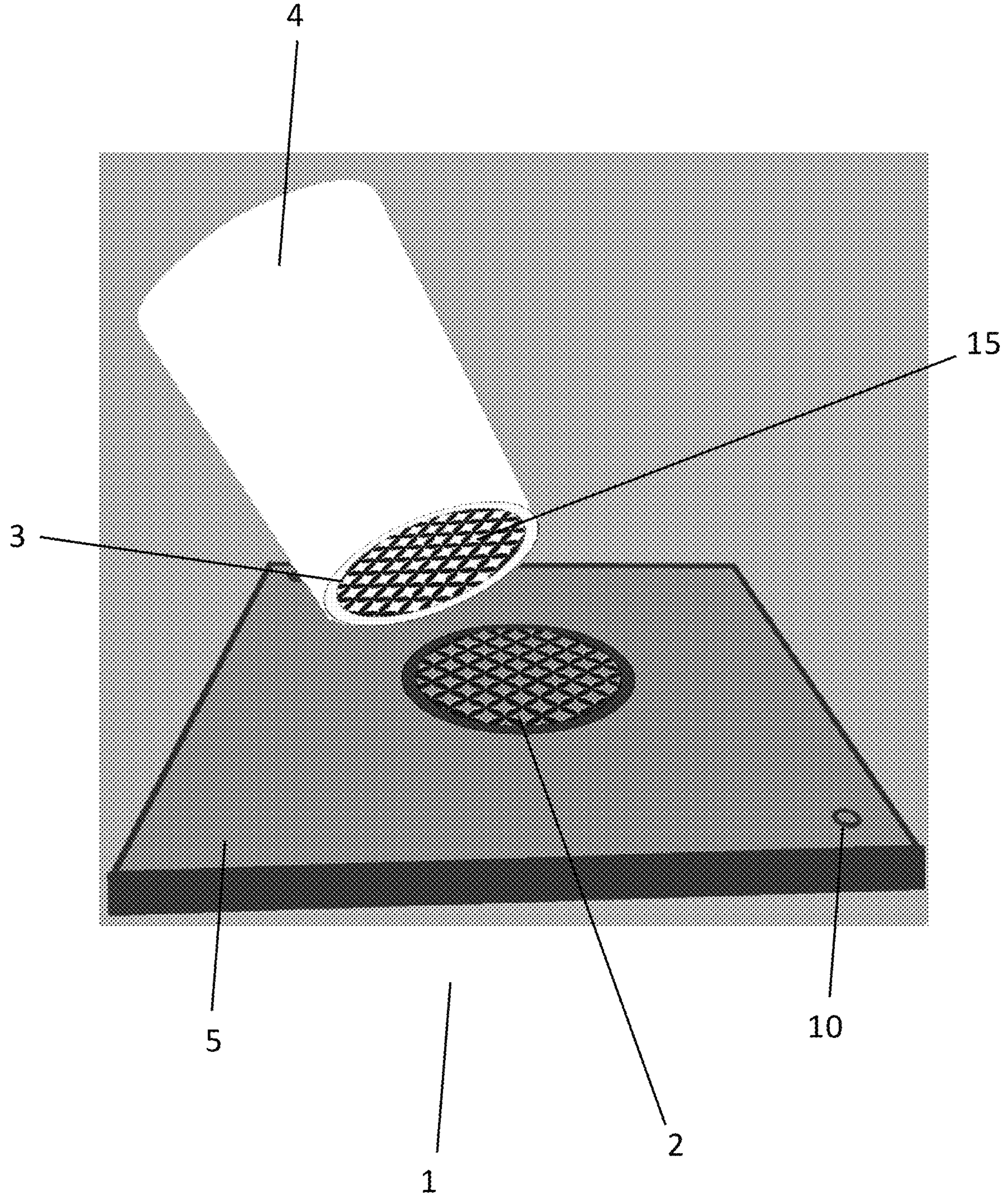
FIG. 13 illustrates a top isometric view of the engraved pattern on the flexible bat being impressed into the pliant clay piece.
Figure 14:
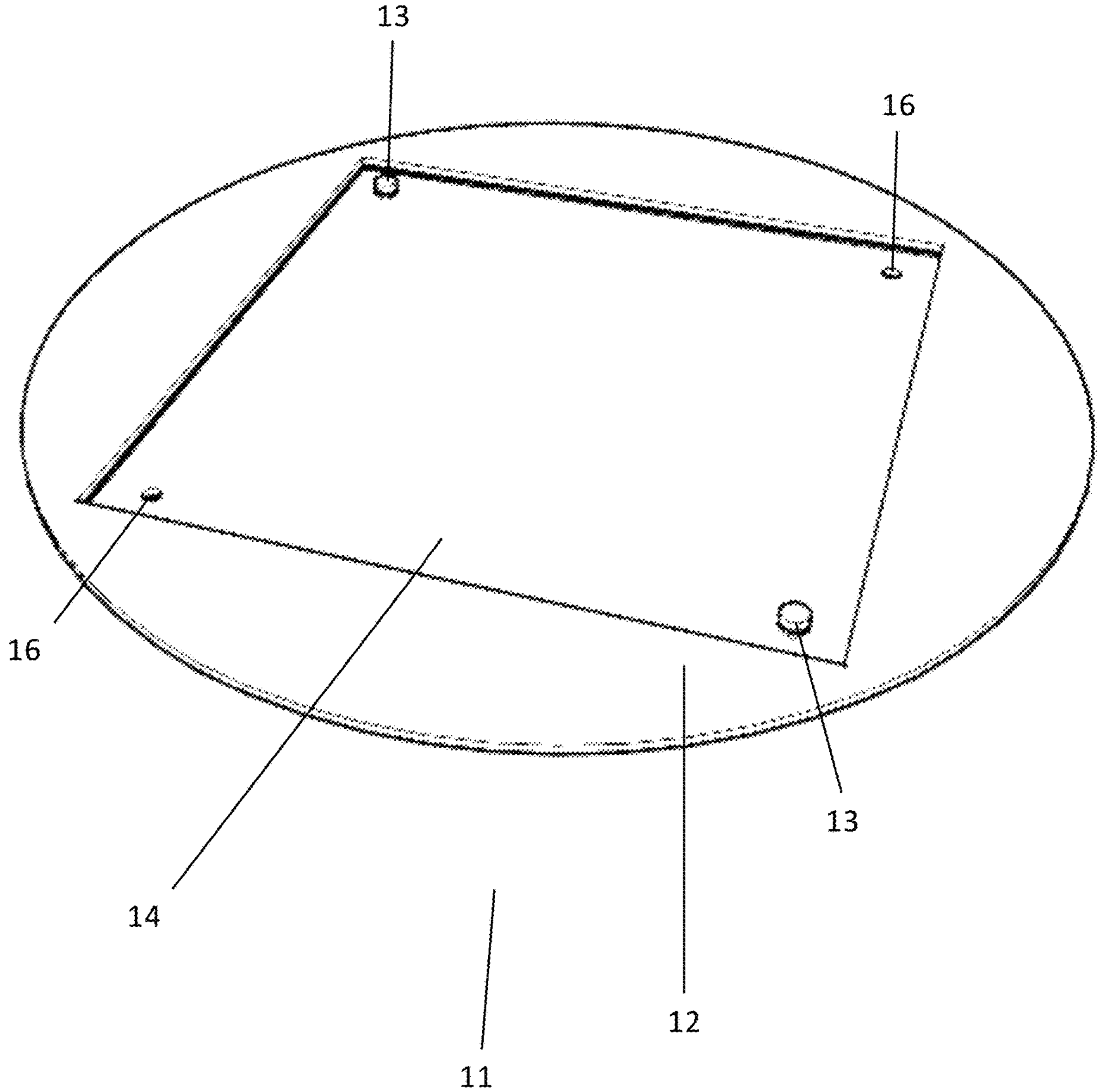
FIG. 14 illustrates a top isometric view of a rigid support structure for holding a flexible bat on a pottery wheel.
Figure 15:
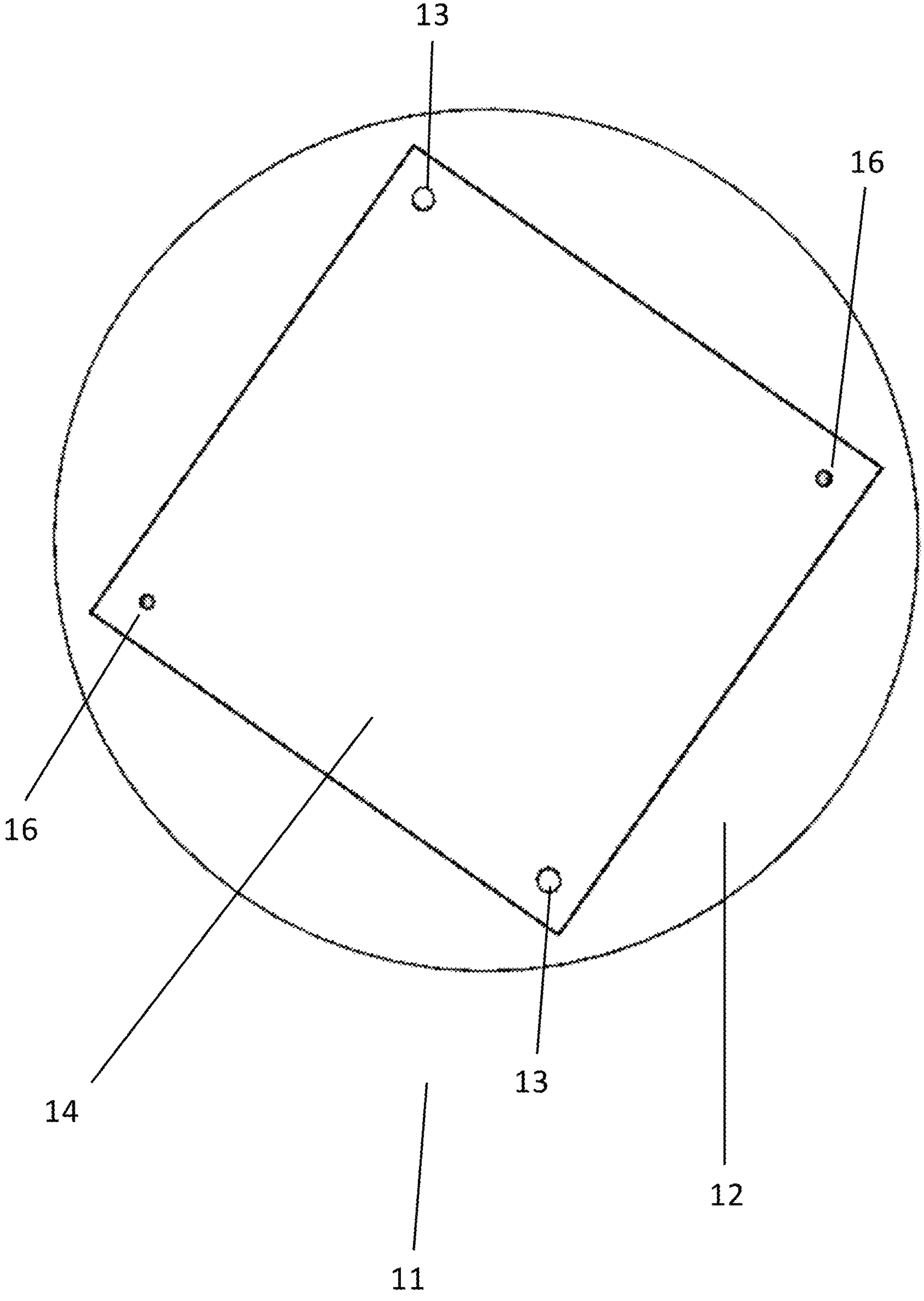
FIG. 15 illustrates a top view of the rigid support structure for holding a flexible bat on a pottery wheel

As illustrated in FIGS. 1-13, the subject invention is a flexible bat 1 for use on a pottery wheel, or potter's wheel. As illustrated in FIG. 13, the flexible bat 1 permits the inverse impression 15 of any specifically desired and preplanned design 2 (such as any texture, art, patterns, wording, or other designs), onto the bottom surface 3 of pliant clay pieces 4 while the pieces 4 are simultaneously being molded on the pottery wheel. These simultaneous steps save time and eliminate the additional steps of impressing these designs 2 to the bottom 3 of pliant clay pieces 4 after molding is completed on the pottery wheel.

In embodiments of the subject invention, the flexible bat 1 is a substantially flat single piece with a substantially flat top surface 5, and a substantially flat bottom surface 6. In embodiments of the subject invention, the configuration of the flexible bat 1 may comprise any shape, including, but not limited to: substantially circular, oval, elliptical, trapezoidal, square, triangular, octagonal or hexagonal. The flexible bat 1 may have a thickness of two to ten millimeters, with a preferred thickness of six millimeters. The flexible bat 1 may be six to twenty inches in length or width. The shape and size of the bat 1 can vary based on dimensions needed for different pottery wheels or different sized designs to be impressed on the bottom of clay workpieces.

Figure 1:
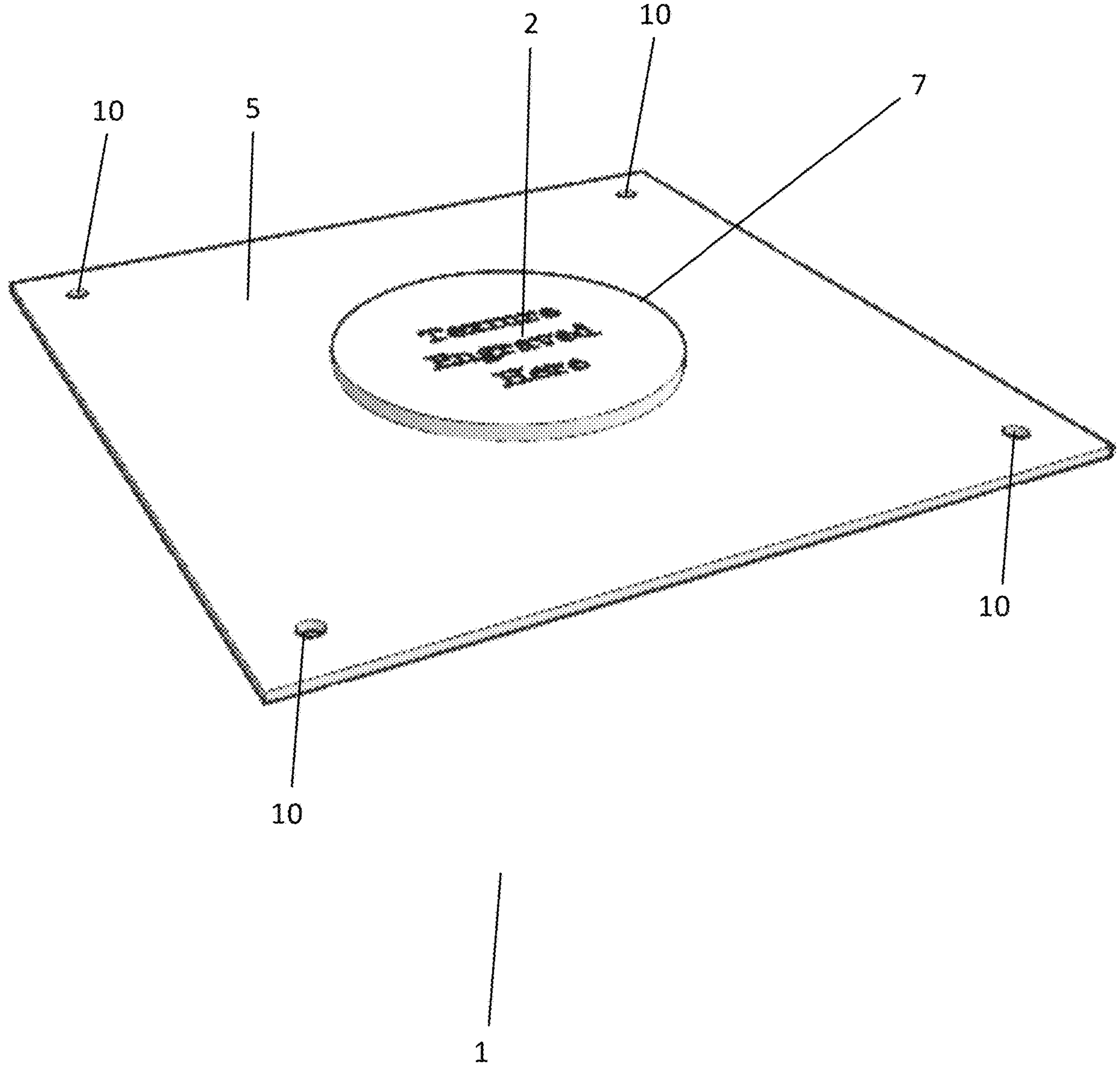
FIG. 1 illustrates a top isometric view of a first embodiment of a flexible pottery wheel bat.
Figure 2:
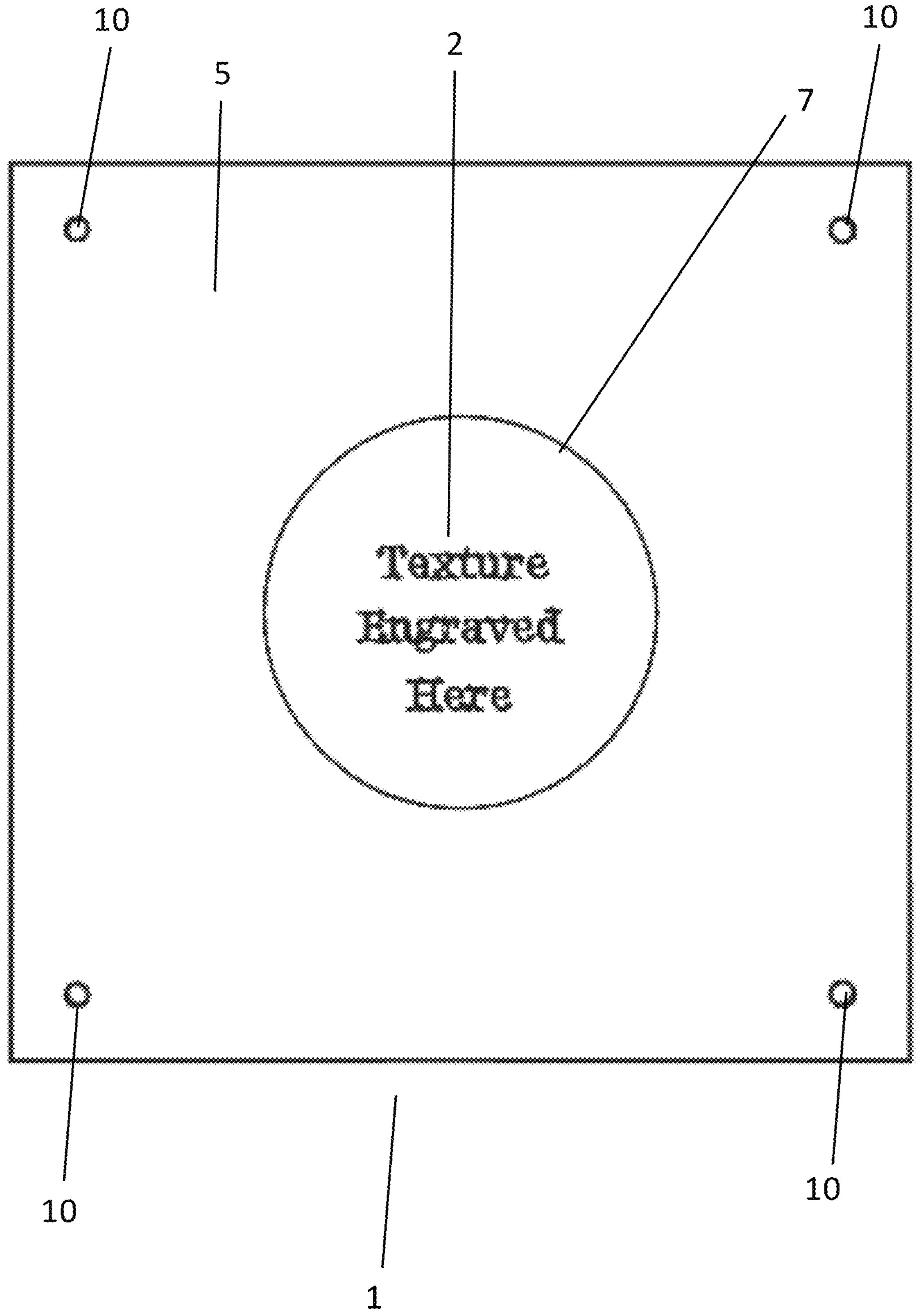
FIG. 2 illustrates a top view of the first embodiment of the flexible pottery wheel bat.
Figure 3:
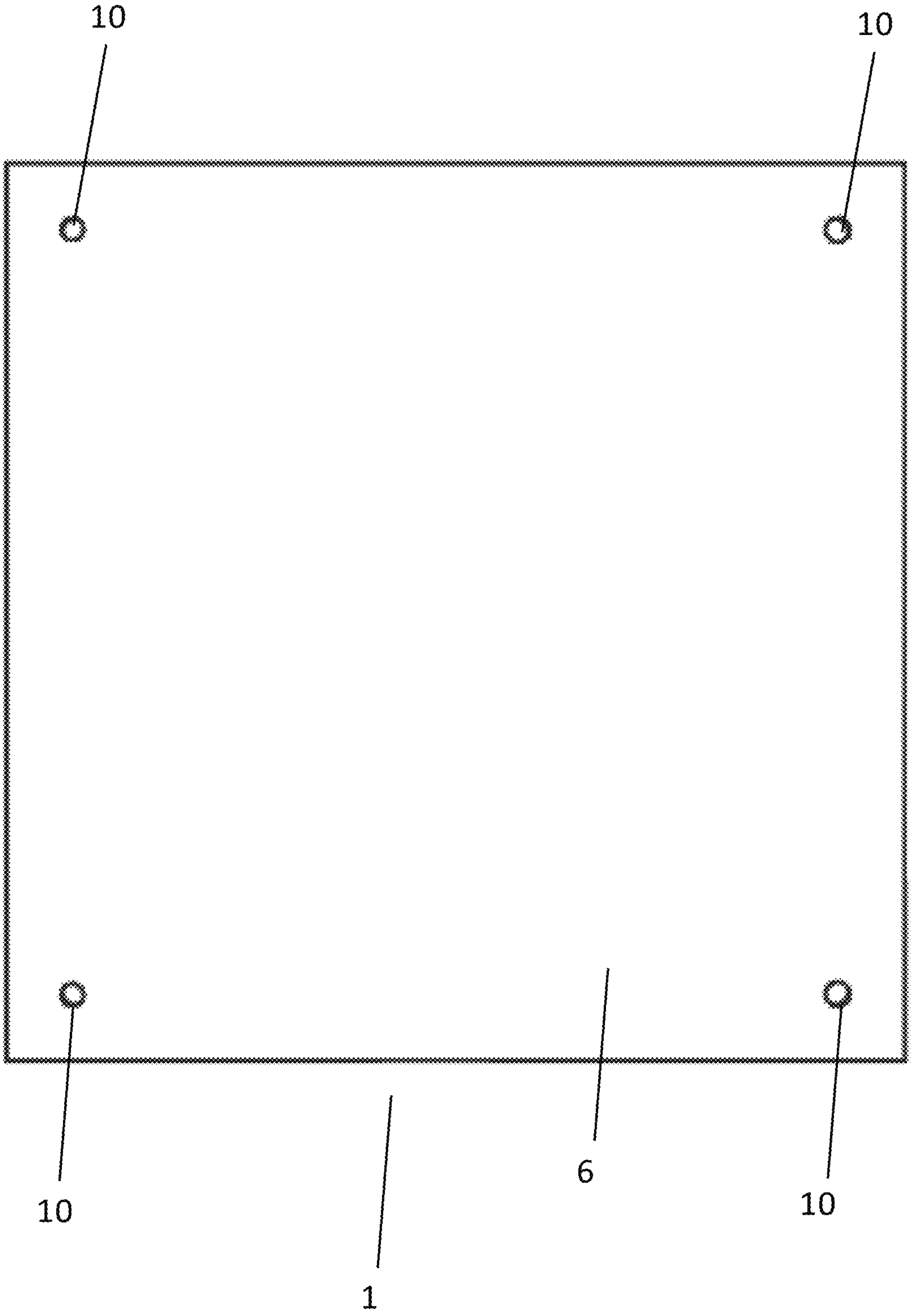
FIG. 3 illustrates a bottom view of the first embodiment of the flexible pottery wheel bat.
Figure 4:
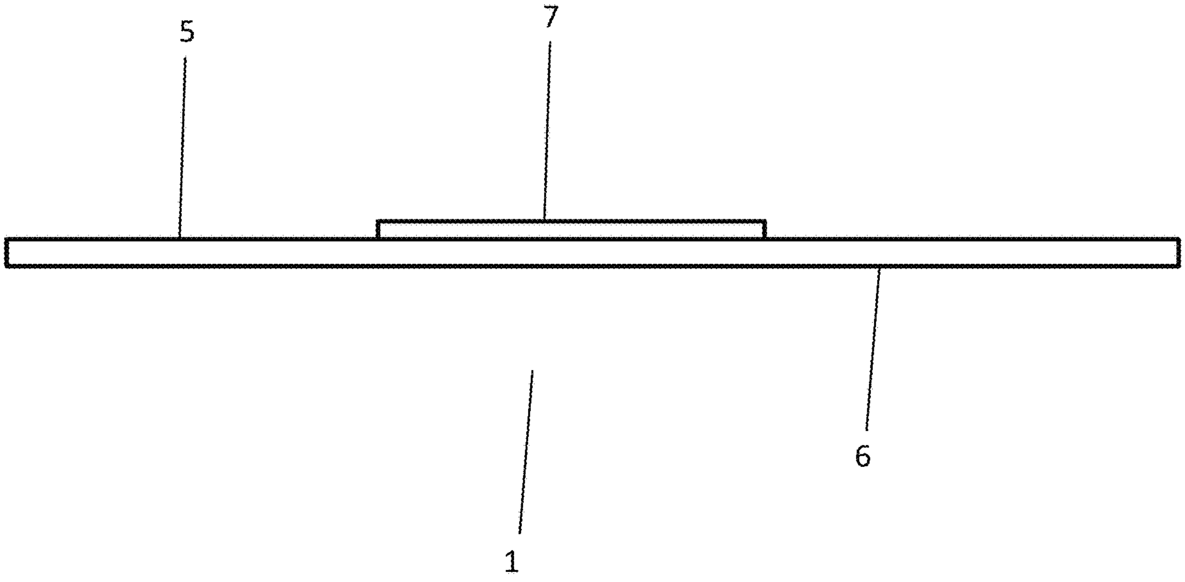
FIG. 4 illustrates a side view of the first embodiment of the flexible pottery wheel bat.
Figure 5:
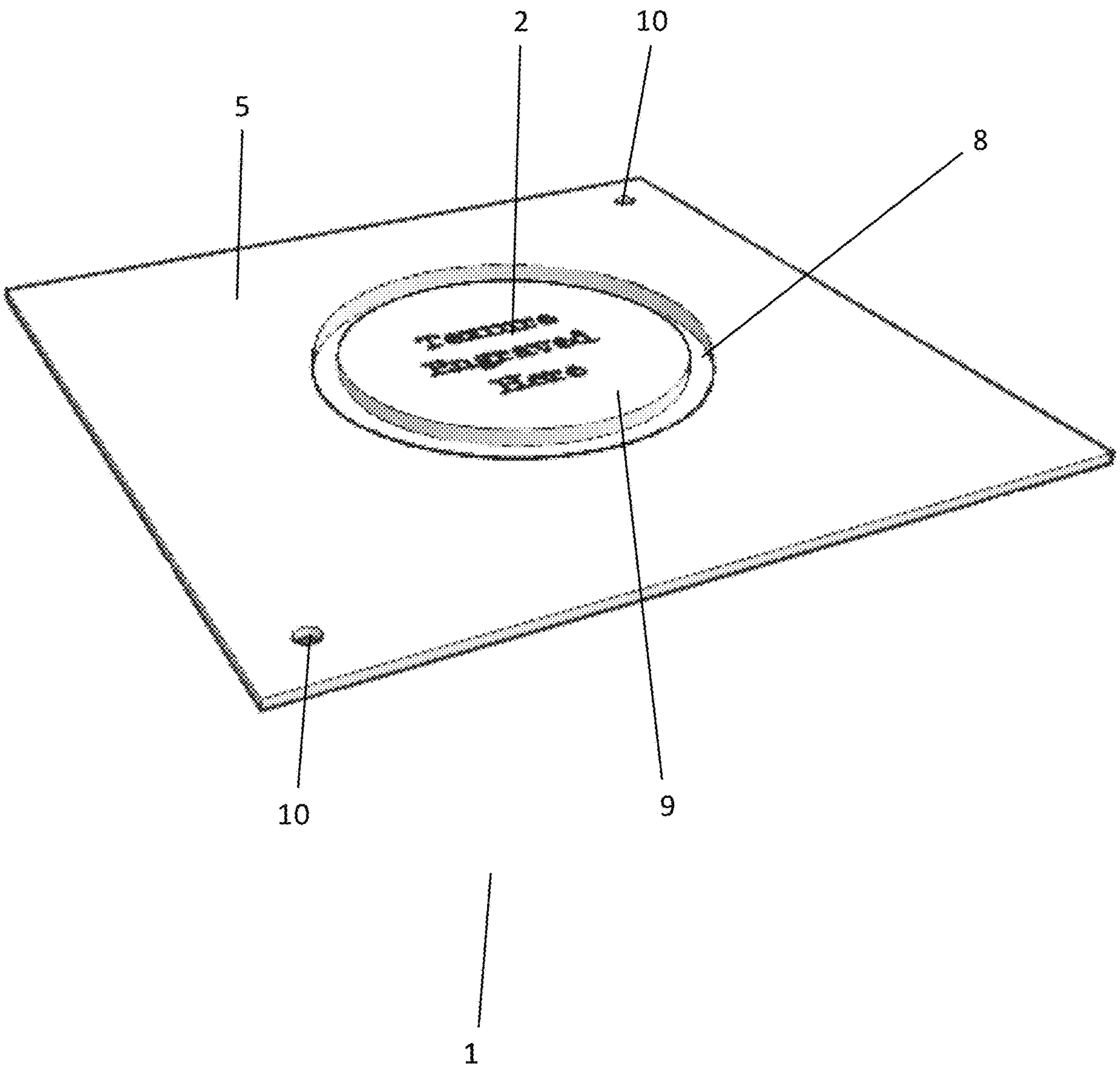
FIG. 5 illustrates a top isometric view of a second embodiment of the flexible pottery wheel bat.
Figure 6:
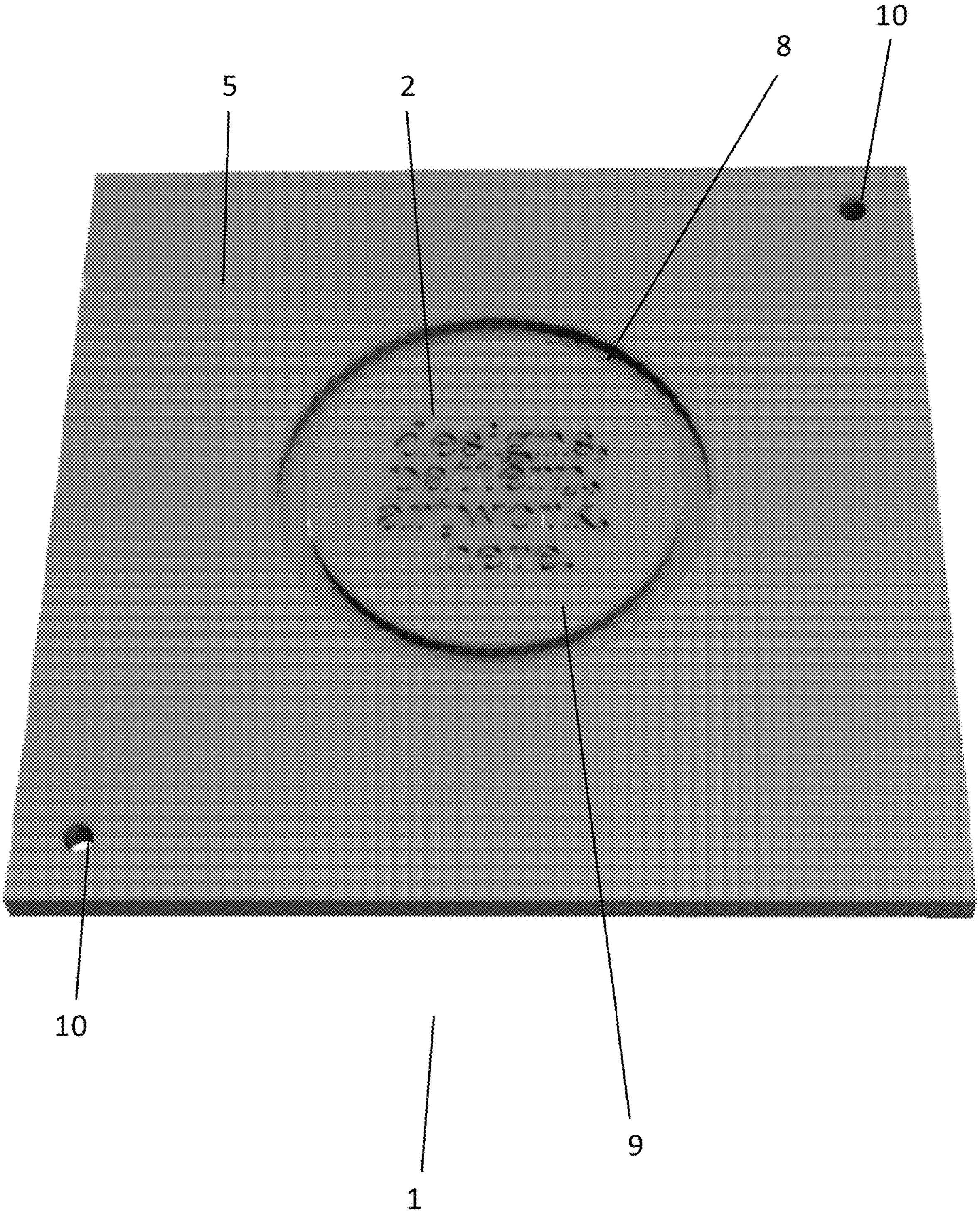
FIG. 6 illustrates another top isometric view of the second embodiment of the flexible pottery wheel bat.
Figure 7:
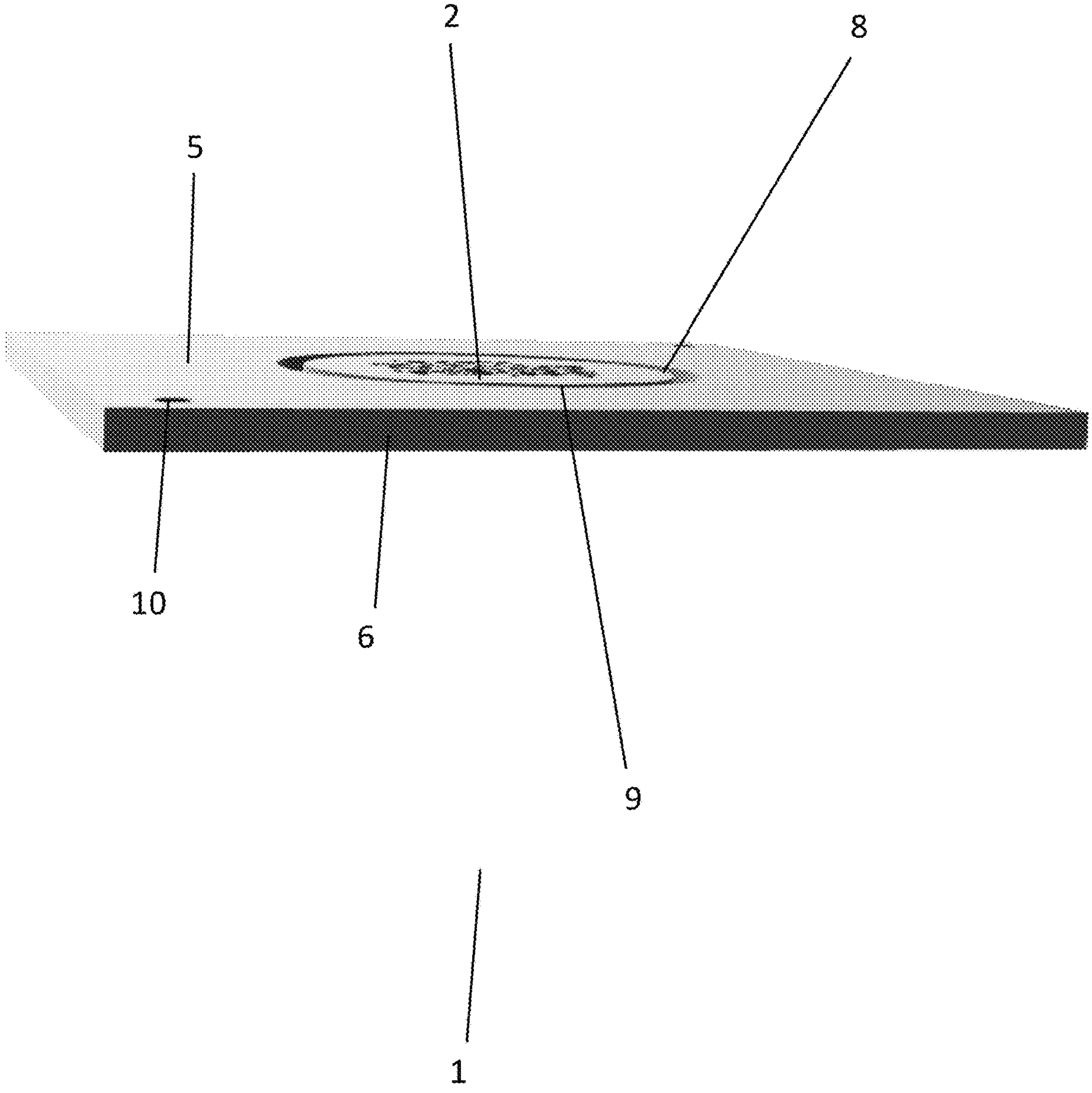
FIG. 7 illustrates a side view of the second embodiment of the flexible pottery wheel bat.
Figure 8:
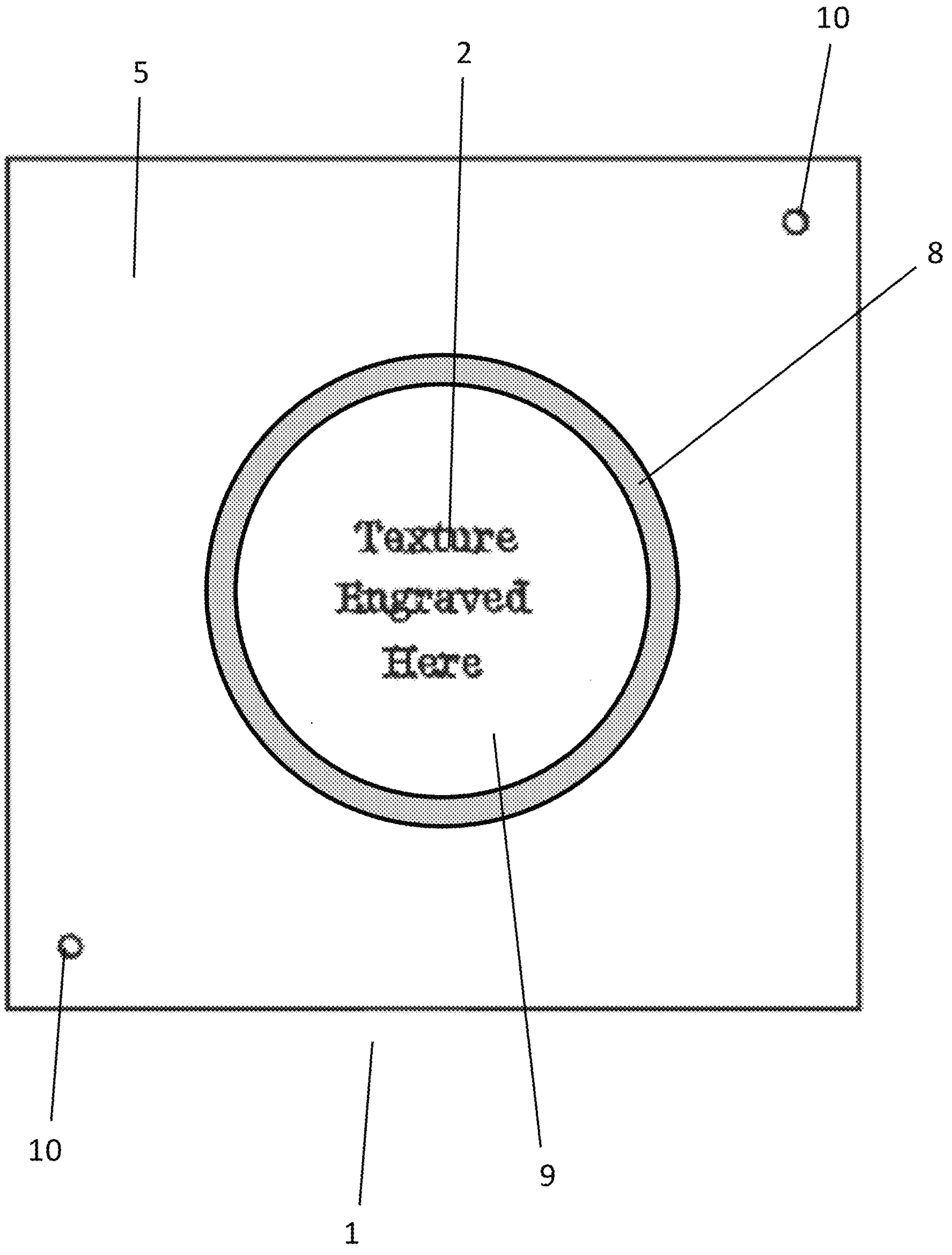
FIG. 8 illustrates a top view of the second embodiment of the flexible pottery wheel bat.
Figure 9:
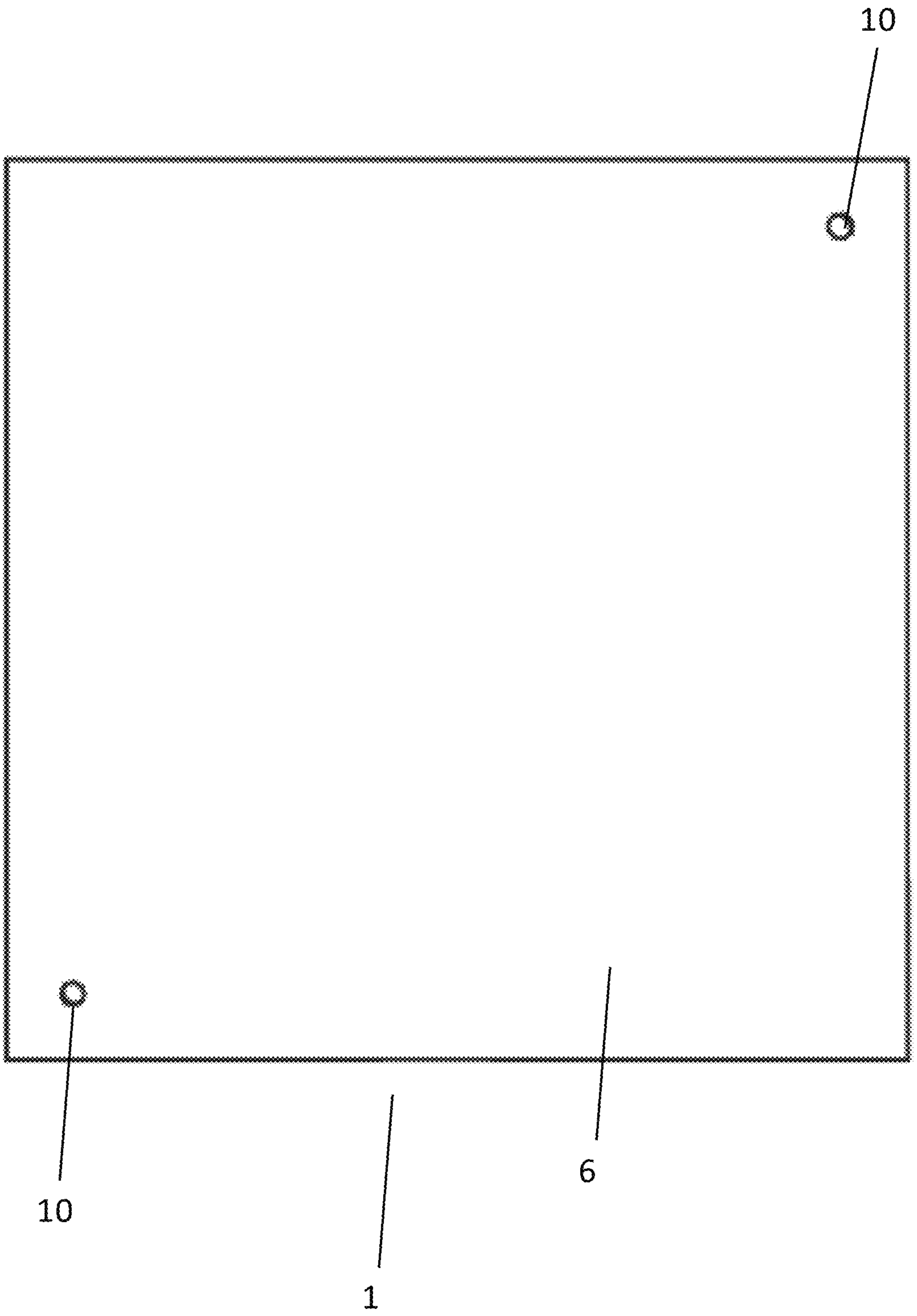
FIG. 9 illustrates a bottom view of the second embodiment of the flexible pottery wheel bat.
Figure 10:
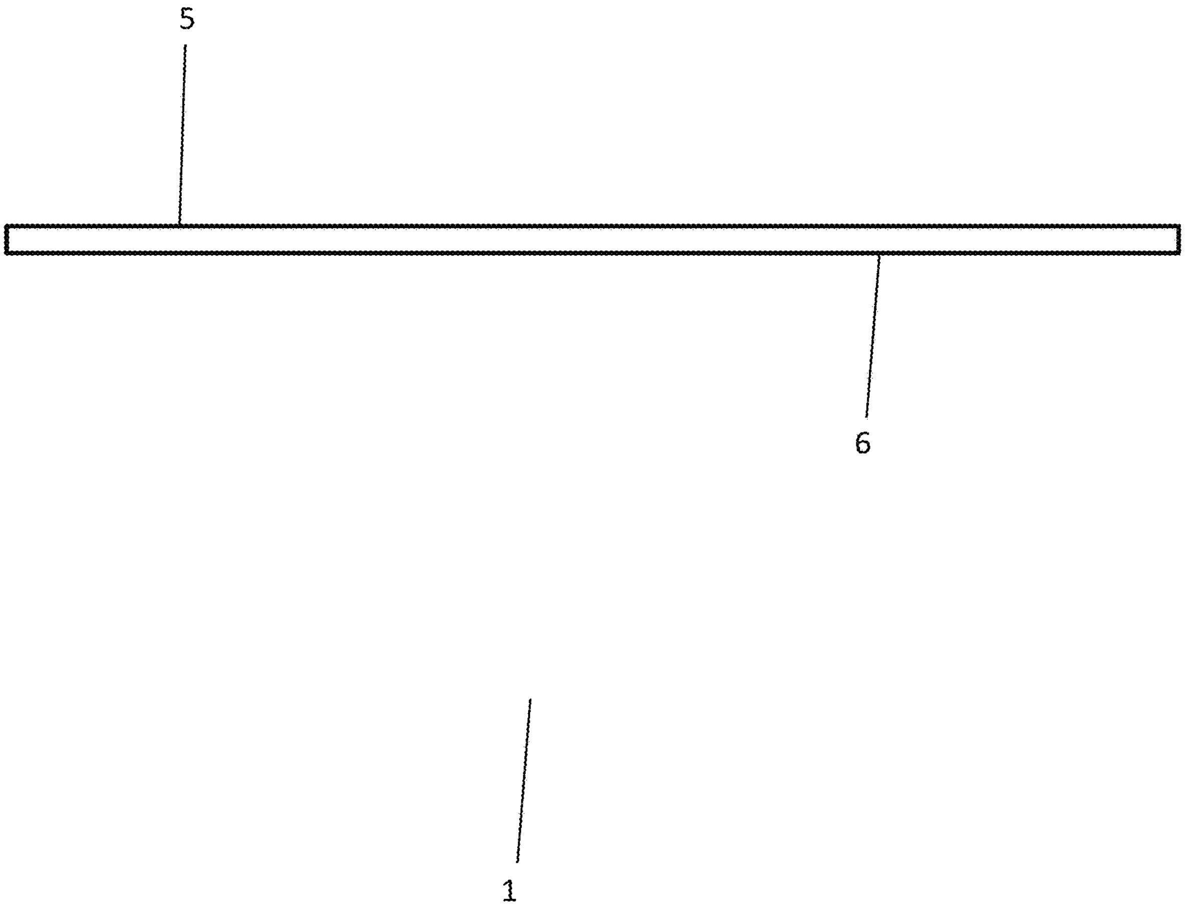
FIG. 10 illustrates another side view of the second embodiment of the flexible pottery wheel bat.
Figure 11:
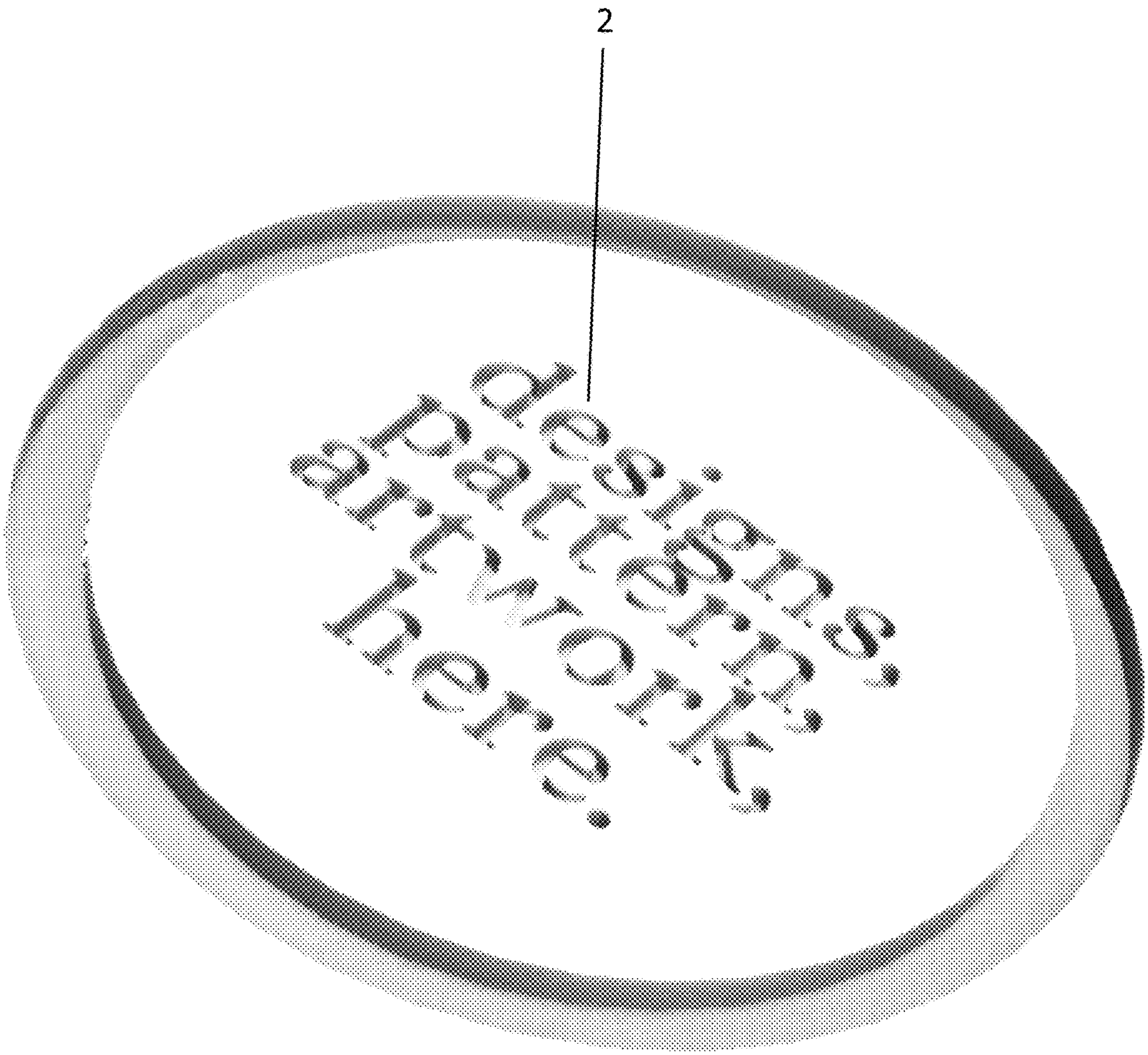
FIG. 11 illustrates a top isometric enlarged view of the engraved pattern in the second embodiment of the flexible pottery wheel bat.
Figure 12:
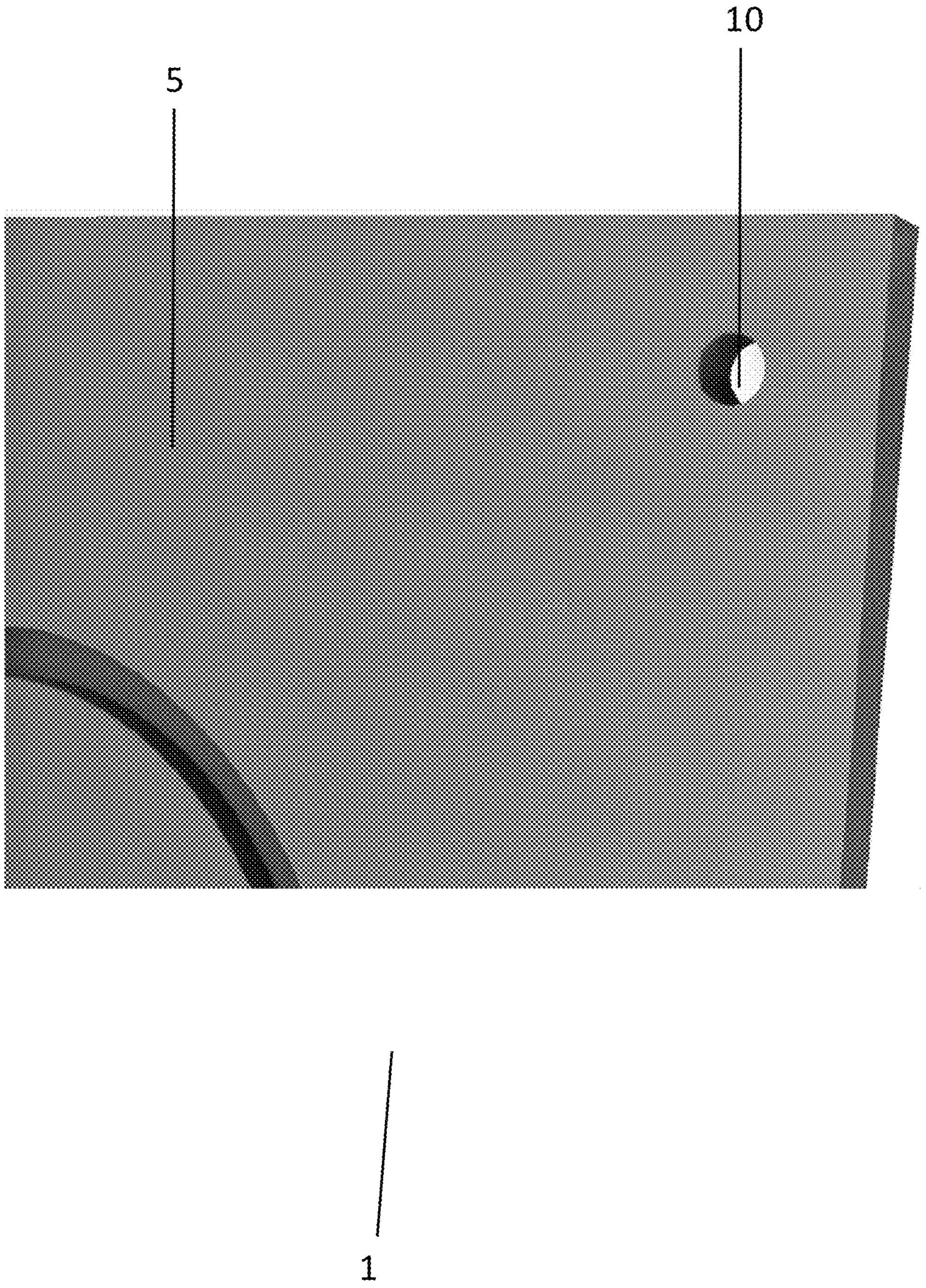
FIG. 12 illustrates a top isometric enlarged view of a bat in hole in the flexible pottery wheel bat.

As illustrated in FIGS. 1, 2, and 4, in some embodiments, the top surface 5 of the bat 1 may contain a raised shape 7 that is substantially cylindrical. The top surface of the cylindrical shape 7 may be engraved, cut, formed, or manufactured with any desired design 2. This design 2 may be repeatedly impressed into the bottom surface 3 of pliant clay pieces 4 while the clay pieces 4 are being molded on the pottery wheel. In embodiments of the subject invention, the cross section of the raised shape 7 may comprise any shape, including, but not limited to: substantially circular, oval, elliptical, trapezoidal, square, triangular, octagonal, or hexagonal.

As illustrated in FIGS. 5-8, in some embodiments, the top surface 5 of the bat 1 may contain an indented shape 8, such as a circle, with a raised shape 9, such as a cylindrical shape within the circle 8. The top surface of the cylindrical shape 9 may be engraved, cut, formed, or manufactured with any desired design 2. This design 2 may be repeatedly impressed into the bottom surface 3 of pliant clay pieces 4 while the clay pieces 4 are being molded on the pottery wheel. In embodiments of the subject invention, the indented shape 8 and raised shape 9 may comprise any shape, including, but not limited to: substantially circular, oval, elliptical, trapezoidal, square, triangular, octagonal, or hexagonal.

The flexible bat 1 may be composed of a flexible foam material. The foam material of the flexible bat 1 permits any attached clay 4 to be easily removed, preserving the integrity and form of the clay piece 4 during and after removal. The foam material of the flexible bat 1 also absorbs water during the molding process without expanding. Because the bat 1 does not swell, it helps keep the impressed design 2 defined. The porosity of the foam also aids in the absorption of water from the clay allowing it to dry evenly. The flexible bat 1 may be created out of Ethylene-vinyl acetate (EVA), also known as poly (ethylene-vinyl acetate) (PEVA).

The desired designs 2 of the flexible bat 1 may be created by hand, downloaded from online databases, or created in image editing software, such as Adobe® Photoshop® or Illustrator®. Image software files may be used to create both engraving and cut paths for laser cutting or CNC milling machines to engrave designs 2 into the flexible bat 1. Designs 2 may also be directly engraved or cut by hand into the flexible bat 1.

The flexible bat 1 contains four to two holes 10 for removably receiving bat pins for attaching the bat 1 to the pottery wheel. The bottom surface 6 of the bat 1 is laid on a wheel head of the pottery wheel with the holes 10 wrapping around the bat pins to help to secure the bat 1. The holes 10 distance and size may vary based on the wheel head the bat 1 will be attaching to.

In further embodiments of the subject invention, the flexible bat 1 may be attached to a rigid support structure 11 for additional stability on the wheel head, and to permit movement of the bat 1 and clay piece from the wheel head at the same time. The rigid support structure 11 may be composed of a sturdy material, such as hard plastic or wood. The rigid support structure 11 is a substantially flat piece with a substantially flat top surface 12, and a substantially flat bottom surface. In embodiments of the subject invention, the rigid support structure 11 may comprise any shape, including, but not limited to: substantially circular, oval, elliptical, trapezoidal, square, triangular, octagonal, or hexagonal.

The rigid support structure 11 may have a thickness of two to twenty millimeters. The top surface 12 of the rigid support structure 11 contains an indented shape 14 for receiving and holding the flexible bat 1. In embodiments of the subject invention, the indented shape 14 of the support structure 11 may comprise any shape, including, but not limited to: substantially circular, oval, elliptical, trapezoidal, square, triangular, octagonal, or hexagonal.

The support structure 11 contains two holes 16 for removably receiving bat pins for attaching the structure 11 to the pottery wheel. The support structure 11 also contains pins 13 for attaching to the holes 10 on the flexible bat 1. The holes 16 and pins 13 of the support structure 11 may vary due to the distance and size on the wheel head and the bat 1.

In additional embodiments of the subject invention, the indented shape 14 of the support structure 11 may contain a substantially flat piece of metal, and the bottom surface 6 of the bat 1 may contain a small magnet to help reinforce the structure 11 and the bat 1 while they are attached.

The primary function of the flexible bat 1 is to give a finished foot or stamped impression on the bottom of a wheel thrown piece of clay with either no or limited added effort and time. The flexible bat 1 can be manufactured with endless images and patterns. The flexible bat 1 can be manufactured with various sizes for wider based workpieces such as larger bowls or smaller plates. Placed directly on the pottery wheel, the flexible bat 1 offers the relief of the loud wobbling and shuffling noise that traditional rigid bats have. Off the pottery wheel, the flexible bat 1 can be used as a relief mould to impress pliant or moldable clay into, allowing a potter to make a pre or post made slab for the bottom of hand built vessels.

The impressions and foot rings made from these designs 2 are deep enough that the potter can still glaze the bottom surfaces of the work clay pieces.

The end result, on the piece of clay, clay form, or clay vessel is intended to represent the inverse of that on the flexible bat 1. This design created can be described as an impression, indent, engraved, manipulated, stamped, or an embossed pattern, design, or art work.

While several variations of the present invention have been illustrated by way of example in particular embodiments, it is apparent that further embodiments could be developed within the spirit and scope of the present invention. However, it is to be expressly understood that such modifications and adaptations are within the spirit and scope of the present invention, and are inclusive, but not limited to the following appended claims as set forth.

What is claimed is:

1. A flexible bat configured to removably attach to a wheel head of a pottery wheel, the flexible bat configured to securely hold a clay workpiece during rotation of the wheel head, the flexible bat comprising:

a flexible body comprising a substantially planar bottom surface configured to engage at least a portion of a top surface of the wheel head, and a substantially planar top surface defining a working surface configured to accept and securely hold the clay workpiece thereon, wherein the body comprises a single piece, formed of a flexible foam material configured to provide elasticity for conforming to the workpiece and facilitating easy removal of the workpiece;

at least two apertures on the flexible body extending from the bottom surface towards the top surface, the at least two apertures being shaped and sized to at least partially receive a bat pin of the wheel head therein;

a raised surface on the top surface of the flexible body, the raised surface comprising an engraved design formed of grooves and ridges that define a textured pattern for imparting an inverse impression on the clay workpiece;

wherein the bat is configured to securely hold and impress an inverse texture of the engraved design on a bottom surface of the clay workpiece while the clay workpiece is securely held on the flexible bat and wheel head during rotation through surface contact and material flexibility that enhances adherence without additional fastening mechanisms; and further wherein the bat is configured to be removable from the bottom surface of the clay workplace such that the inverse texture of the engraved design remains impressed on the bottom surface of the clay workpiece after removal.

2. The flexible bat of claim 1, wherein the flexible body comprises a shape selected from the group consisting of substantially circular, oval, elliptical, trapezoidal, square, triangular, octagonal, and hexagonal.

3. The flexible bat of claim 1, wherein the flexible body comprises a thickness of 2 to 10 millimeters.

4. The flexible bat of claim 1, wherein the flexible body comprises a length and width of 6 to 20 inches.

5. The flexible bat of claim 1, wherein the raised shape comprises a shape selected from the group consisting of substantially circular, oval, elliptical, trapezoidal, square, triangular, octagonal, and hexagonal.

6. The flexible bat of claim 1, wherein the flexible body is composed of ethylene-vinyl acetate (EVA).

7. The flexible bat of claim 1, further comprising a substantially flat rigid support structure configure to provide additional stability to the bat on the wheel head, wherein the rigid support structure comprises a rigid body comprising a substantially planar bottom surface to engage at least a portion of the top surface of the wheel head, and a substantially planar top surface to engage the bottom surface of the flexible bat, wherein the rigid body comprises a single piece.

* * * * *